United States Patent
Kurata

(10) Patent No.: US 11,263,516 B2
(45) Date of Patent: Mar. 1, 2022

(54) NEURAL NETWORK BASED ACOUSTIC MODELS FOR SPEECH RECOGNITION BY GROUPING CONTEXT-DEPENDENT TARGETS

(71) Applicant: INTERNATIONAL BUSINESS MACHINES CORPORATION, Armonk, NY (US)

(72) Inventor: Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1151 days.

(21) Appl. No.: 15/226,478

(22) Filed: Aug. 2, 2016

(65) Prior Publication Data

US 2018/0039883 A1    Feb. 8, 2018

(51) Int. Cl.
| | | |
|---|---|---|
| *G06N 3/04* | (2006.01) | |
| *G06N 7/00* | (2006.01) | |
| *G06N 3/08* | (2006.01) | |
| *G10L 15/16* | (2006.01) | |
| *G10L 15/06* | (2013.01) | |

(52) U.S. Cl.
CPC ........... *G06N 3/0454* (2013.01); *G06N 3/084* (2013.01); *G06N 7/005* (2013.01); *G10L 15/16* (2013.01); *G10L 15/063* (2013.01)

(58) Field of Classification Search
CPC ...... G06N 3/0454; G06N 3/084; G06N 7/005; G10L 15/16; G10L 15/063
See application file for complete search history.

(56) References Cited

U.S. PATENT DOCUMENTS

| | | | | |
|---|---|---|---|---|
| 5,317,673 A | * | 5/1994 | Cohen | .................. G10L 15/144 704/232 |
| 9,153,231 B1 | * | 10/2015 | Salvador | ............... G10L 15/065 |
| 2011/0321164 A1 | * | 12/2011 | Saxena | ................. G06F 21/577 726/25 |
| 2015/0095026 A1 | * | 4/2015 | Bisani | ..................... G10L 15/08 704/232 |

OTHER PUBLICATIONS

C. Zhang and P. C. Woodland, "Standalone training of context-dependent deep neural network acoustic models," 2014 IEEE International Conference on Acoustics, Speech and Signal Processing (ICASSP), Florence, 2014, pp. 5597-5601. (Year: 2014).*

(Continued)

*Primary Examiner* — Brian M Smith
(74) *Attorney, Agent, or Firm* — Tutunjian & Bitetto, P.C.; Randall Bluestone

(57) ABSTRACT

Methods and systems for training a neural network include identifying weights in a neural network between a final hidden neuron layer and an output neuron layer that correspond to state matches between a neuron of the final hidden neuron layer and a respective neuron of the output neuron layer. The identified weights are initialized to a predetermined non-zero value and initializing other weights between the final hidden neuron layer and the output neuron layer to zero. The neural network is trained based on a training corpus after initialization.

18 Claims, 6 Drawing Sheets

(56) References Cited

OTHER PUBLICATIONS

Alex Krizhevsky, Ilya Sutskever, Geoffrey E. Hinton, "ImageNet Classification with Deep Convolutional Neural Networks," Advances in neural information processing systems, Jan. 2012. (Year: 2012).*
M. N. Bojnordi and E. Ipek, "Memristive Boltzmann machine: A hardware accelerator for combinatorial optimization and deep learning," 2016 IEEE International Symposium on High Performance Computer Architecture (HPCA), Barcelona, 2016, pp. 1-13. (Year: 2016).*
Li, X. et al., "Labeling unsegmented sequence data with DNN-HMM and its application for speech recognition," 9th Intl. Symp. on Chinese Spoken Language Processing (2014) pp. 10-14. (Year: 2014).*
Zhang, C. et al., "Standalone training of context-dependent deep neural network acoustic models," 2014 IEEE Conf. on Acoustic, Speech, and Signal Processing (2014) 5 pp. (Year: 2014).*
George E. Dahl et al., Context-Dependent Pre-Trained Deep Neural Networks for Large-Vocabulary Speech Recognition, IEEE Transactions on Audio, Speech, and Language Processing, vol. 20, No. 1, Jan. 2012.
Tara N. Sainath et al., Deep Convolutional Neural Networks for Large-scale Speech Tasks, Neural Networks, Apr. 2015, pp. 39-48, vol. 64.

* cited by examiner

NEURAL NETWORK BASED ACOUSTIC MODELS FOR SPEECH RECOGNITION BY GROUPING CONTEXT-DEPENDENT TARGETS

BACKGROUND

Technical Field

The present invention generally relates to speech recognition and, more particularly, to the training of neural network acoustic models using emphasized initial training data.

Description of the Related Art

Neural network based acoustic models (NN-AMs) are providing significant advances in speech recognition over conventional Gaussian mixture model acoustic models. In a hybrid system of a neural network and a hidden Markov model (NN-HMM), NN-AMs are used to estimate the posterior probabilities for acoustic observations and these probabilities are then used for decoding in combination with the hidden Markov model (HMM).

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

In a context-dependent HMM, each output target is treated independently. For example, while the context-dependent HMM states of A-b-2 (the second variant of the beginning state of A) and A-m-1 (the first variant of the middle state of A) both correspond to the phone A, and A-b-1 and A-b-2 both correspond to the context-independent HMM state A-b, these relationships are not explicitly considered.

SUMMARY

A method for training a neural network include identifying weights in a neural network between a final hidden neuron layer and an output neuron layer that correspond to state matches between a neuron of the final hidden neuron layer and a respective neuron of the output neuron layer. The identified weights are initialized to a predetermined non-zero value and initializing other weights between the final hidden neuron layer and the output neuron layer to zero. The neural network is trained based on a training corpus after initialization.

A method for speech recognition includes identifying weights in a neural network between a final hidden neuron layer and an output neuron layer that correspond to state matches between a neuron of the final hidden neuron layer and a respective neuron of the output neuron layer. The identified weights are initialized to a predetermined non-zero value, randomly initializing weights associated with neurons in the final hidden neuron layer that do not match a state of any of the output neurons, and initializing all other weights between the final hidden neuron layer and the output neuron layer to zero. The neural network is trained based on a training corpus after initialization by updating all weights in a weight array between the final hidden neuron layer and the output neuron layer, including the identified weights. Speech recognition is performed using the trained neural network to convert audio voice information into textual information.

A system for training a neural network includes an initializing module having a processor configured to identify weights in a neural network between a final hidden neuron layer and an output neuron layer that correspond to state matches between a neuron of the final hidden neuron layer and a respective neuron of the output neuron layer and further configured to initialize the identified weights to a predetermined non-zero value and initializing other weights between the final hidden neuron layer and the output neuron layer to zero. A training module is configured to train the neural network based on a training corpus after initialization.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention train neural network based acoustic models (NN-AMs) using the predetermined relationships between context-dependent hidden Markov model (CD-HMM) states. A fixed number of neurons are treated as dedicated for phone or context-independent HMM (CI-HMM) states that are initialized to strongly connect to the corresponding CD-HMM output neurons. Weights between the dedicated neurons and the corresponding CD-HMM output neurons are initialized to a constant value, while weights between the dedicated neurons and the other CD-HMM output units are initialized to zero. Training is then performed, using these initial states, to capture the prior knowledge of the relationship between the CD-HMM states that would not otherwise have been considered.

Thus, the present embodiments define a group of CD-HMM states based on corresponding CI-HMM states or phones. Then, for each group, dedicated neurons in the hidden layer just below the output layer are prepared, with each dedicated neuron for a specific group being initialized to connect to the outputs of the CD-HMM states that belong to that group more strongly to the other output units. This step is performed specifically during neural network parameter initialization, such that no computational overhead is needed during training or at run-time.

The principle behind this specific initialization is that the grouped CD-HMM states have some common acoustic characteristics and the dedicated neurons serve as a basis for representing these characteristics. With enough training data and optimization, the NN-AM automatically learns these characteristics. As such, the present embodiments integrate prior knowledge of the relationships between CD-HMM states into the NN-AM for improved optimization.

Figure 1:
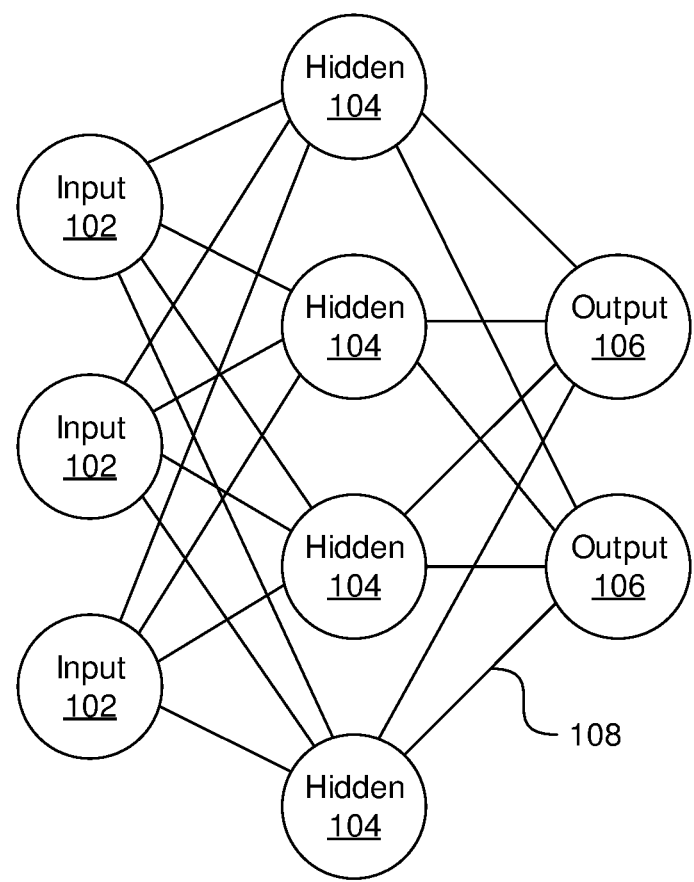
FIG. 1 is a diagram of a neural network.
Figure 2:
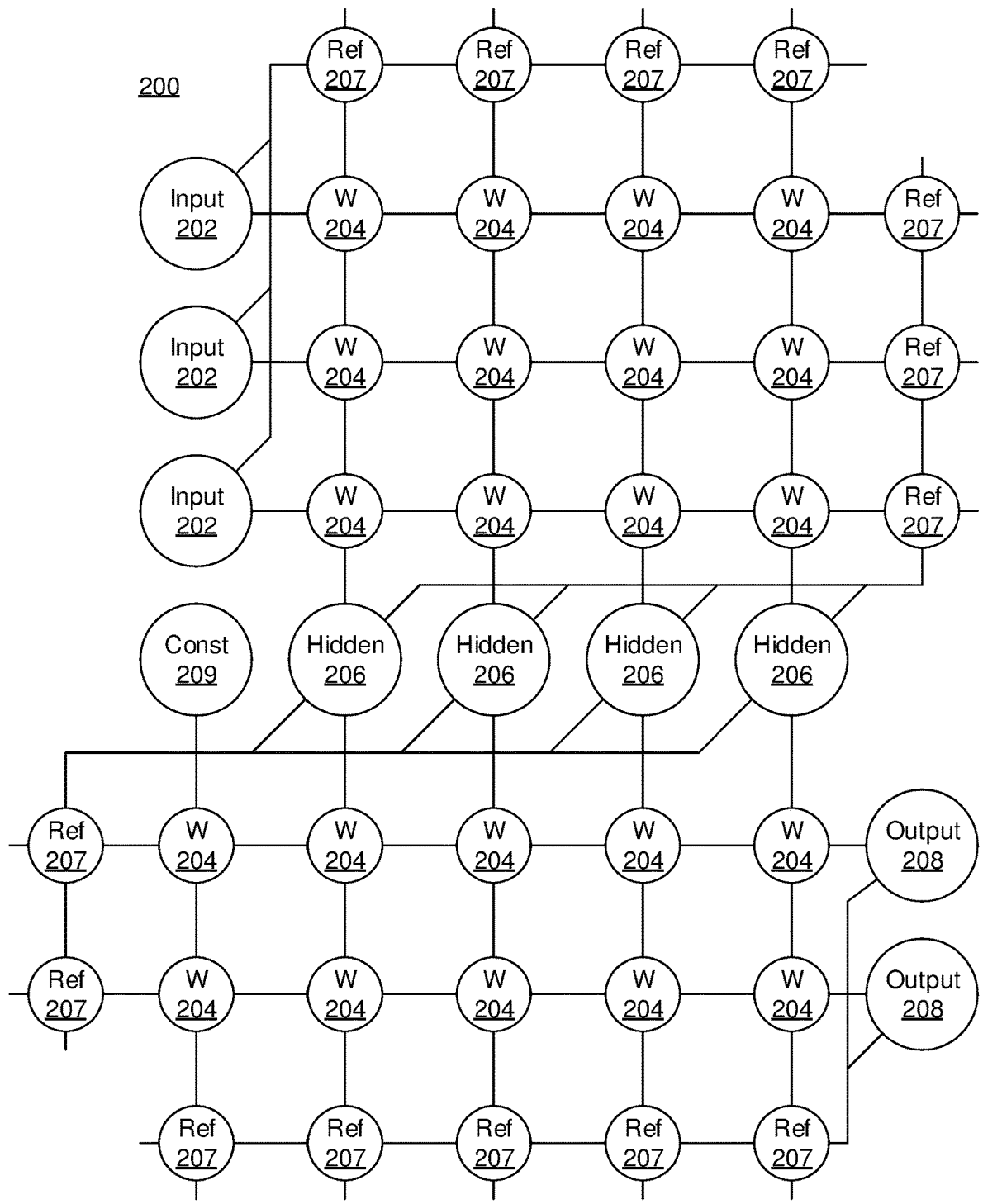
FIG. 2 is a diagram of a neural network having weights initialized to provide dedicated neurons for certain states in accordance with the present principles.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. During feed-forward operation, a set of input neurons 202 each provide an input voltage in parallel to a respective row of weights 204. The weights 204 each have a settable resistance value, such that a current output flows from the weight 204 to a respective hidden neuron 206 to represent the weighted input. The current output by a given weight is determined as $$I = \frac{V}{r},$$

where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 207. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 provide combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 3:
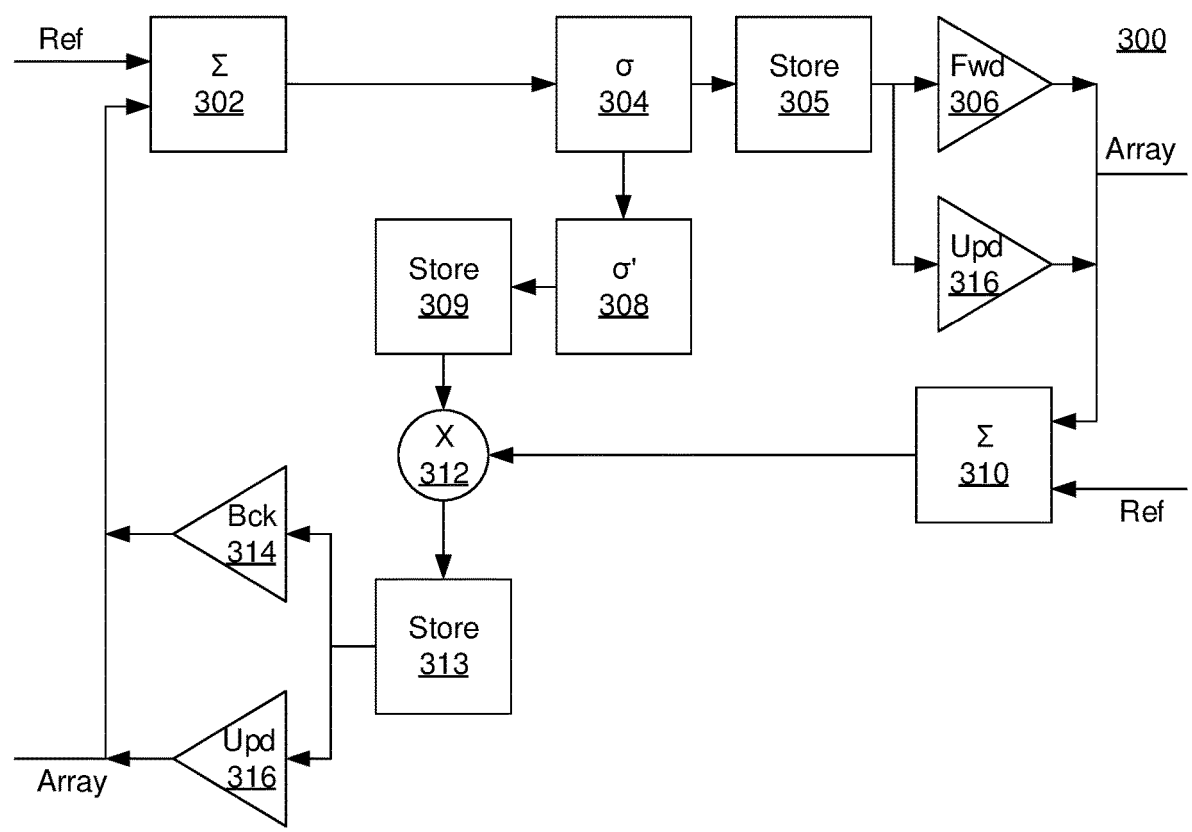
FIG. 3 is a block diagram of circuitry for reading from, writing to, and training a neural network in accordance with the present principles.

Referring now to FIG. 3, a block diagram of a neuron 300 is shown. This neuron may represent any of the input neurons 202, the hidden neurons 206, or the output neurons 208. It should be noted that FIG. 3 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes.

In feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal may be generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

During weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In one particular embodiment, the weights 204 may be implemented in software or in hardware, using relatively complicated weighting circuitry or using resistive cross point devices. Such resistive devices may have switching characteristics that have a non-linearity that can be used for processing data. The weights 204 may belong to a class of device called a resistive processing unit (RPU), because their non-linear characteristics are used to perform calculations in the neural network 200. The RPU devices may be implemented with resistive random access memory (RRAM), phase change memory (PCM), programmable metallization cell (PMC) memory, or any other device that has non-linear resistive switching characteristics. Such RPU devices may also be considered as memristive systems.

Embodiments of the present invention initialize the values of the weights 204 in accordance with CD-HMM states or phones that correspond with output neurons 208. The weights 204 in each array may be expressed as a matrix of values. The matrix corresponding to the array of weights 204 between the final layer of hidden neurons 206 and the output neurons 208 has rows corresponding to CI-HMM states or to phones and has columns corresponding to the CD-HMM states of the output neurons 208. For the rows associated with the CI-HMM states, the weight 204 is initialized to some constant value C, while for other CD-HMM or phone rows the weight 204 is initialized to zero. Some rows in the matrix may not be associated phones or CI-HMM, and weights 204 represented by these rows are initialized randomly. In the following matrix examples, a CD-HMM state is represented with the pattern X-Y-Z, with X representing the phone label, Y is one of 'b,' 'm,' or 'e' corresponding to the beginning, middle, and end states of the HMM, and Z is the index of different variants, with '*' representing a wildcard, matching any label or index.

The table below shows a weight matrix between the last layer of hidden neurons 206 and the output neurons 208. In this example, the rows represent phones. For each weight in a row and column that have corresponding phones (e.g., each entry in the matrix in the A row and in a column beginning with an A) has an initial value set to the constant C. All other values in that row are set to zero. For rows that do not correspond to a particular phone, the values are initialized to random values (denoted herein as '?').

|   | A-b-1 | A-b-2 | A-m-1 | A-e-1 | A-e-2 | E-b-1 | E-b-2 | E-b-3 | ... | Z-e-1 |
|---|---|---|---|---|---|---|---|---|---|---|
| A | C | C | C | C | C | 0 | 0 | 0 | ... | 0 |
| E | 0 | 0 | 0 | 0 | 0 | C | C | C | ... | 0 |
| ... | ... | ... | ... | ... | ... | ... | ... | ... | ... | ... |
| Z | 0 | 0 | 0 | 0 | 0 | 0 | 0 | 0 | ... | C |
| None | ? | ? | ? | ? | ? | ? | ? | ? | ? | ? |
| None | ? | ? | ? | ? | ? | ? | ? | ? | ? | ? |

The next table shows a similar matrix, but in this instance the rows represent CI-HMM states. In this matrix, for each weight in a row and column that have corresponding HMM states (e.g., each entry in the matrix in the A-b row and in a column beginning with A-b) has an initial value set to the constant C. All other values in that row are set to zero. As above, for rows that do not correspond to a particular CI-HMM state, the values are initialized to random values.

|       | A-b-1 | A-b-2 | A-m-1 | A-e-1 | A-e-2 | E-b-1 | E-b-2 | E-b-3 | ... | Z-e-1 |
|-------|-------|-------|-------|-------|-------|-------|-------|-------|-----|-------|
| A-b   | C     | C     | 0     | 0     | 0     | 0     | 0     | 0     | ... | 0     |
| A-m   | 0     | 0     | C     | 0     | 0     | 0     | 0     | 0     | ... | 0     |
| A-e   | 0     | 0     | 0     | C     | C     | 0     | 0     | 0     | ... | 0     |
| E-b   | 0     | 0     | 0     | 0     | 0     | C     | C     | C     | ... | 0     |
| ...   | ...   | ...   | ...   | ...   | ...   | ...   | ...   | ...   | ... | ...   |
| Z-e   | 0     | 0     | 0     | 0     | 0     | 0     | 0     | 0     | ... | C     |
| None  | ?     | ?     | ?     | ?     | ?     | ?     | ?     | ?     | ... | ?     |
| None  | ?     | ?     | ?     | ?     | ?     | ?     | ?     | ?     | ... | ?     |

The number of phones is represented herein as $N_p$, the number of CI-HMM states is represented as $N_{CI}$, the number of CD-HMM states is represented as $N_{CD}$ (which is equal to the number of output neurons 208), and the number of hidden neurons 206 in the final hidden layer is represented as $N_h$. The size of the weight matrix is therefore $N_h \times N_{CD}$.

Figure 7:
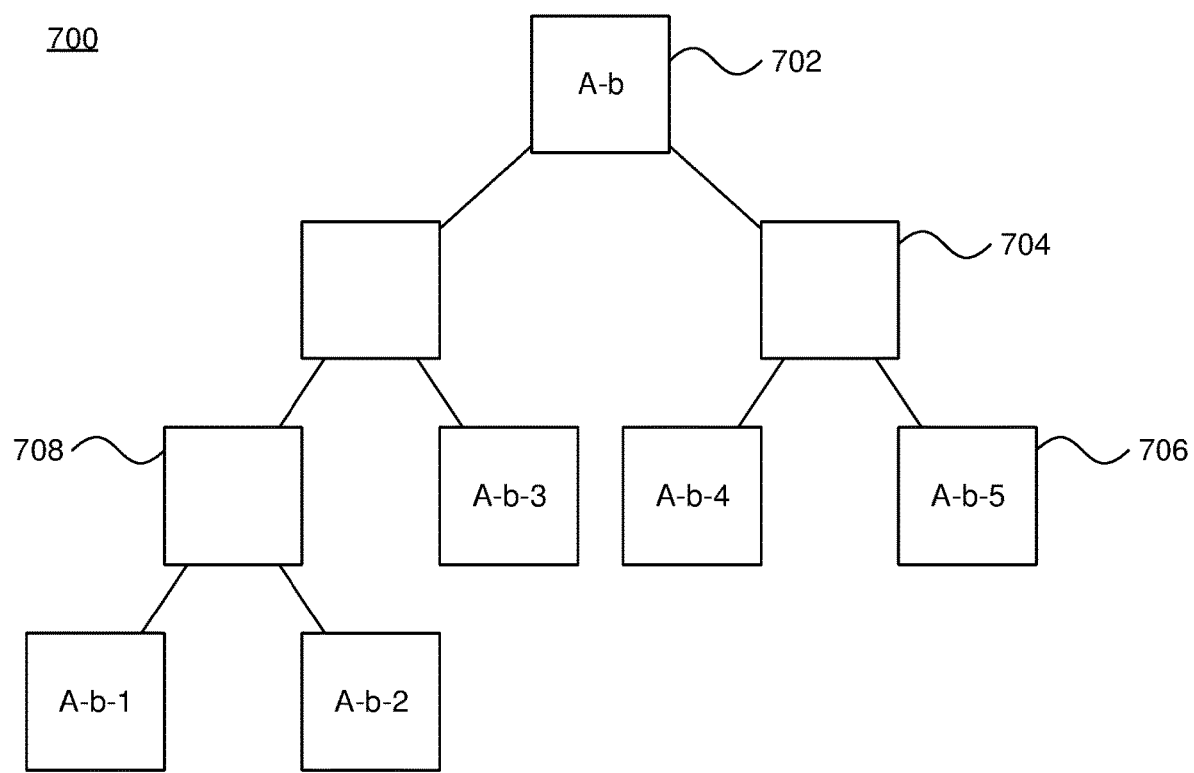
FIG. 7 is a diagram of a phonetic tree to be used in neural network initialization in accordance with the present principles.

Referring now to FIG. 7, a phonetic decision tree structure 700 is shown. The phonetic decision tree is generally predetermined structure with decision points at each node determining whether where given phones are. A root node 702 defines the CI-HMM state (e.g., A-b), with all nodes descending from the root node 702 representing paths to particular CD-HMM states, which are represented by the leaf nodes 706 of the tree structure 700. One level down from the root node 702 are two nodes 704, which represent the dedicated neurons, forming respective left and right branches. Further intermediate nodes, such as node 708, do not have their own dedicated neurons. It should be noted that the example of FIG. 7 is just one embodiment, and that deeper trees may be used instead, with deeper branching nodes being used as dedicated neurons. This produces an exemplary weight matrix as follows, with the left branch being designated by A-b-1 and the right branch being designated by A-b-r:

|       | A-b-1 | A-b-2 | A-b-3 | A-b-4 | A-b-5 | A-m-1 | ... | Z-e-1 |
|-------|-------|-------|-------|-------|-------|-------|-----|-------|
| A-b-1 | C     | C     | C     | 0     | 0     | 0     | ... | 0     |
| A-b-r | 0     | 0     | 0     | C     | C     | 0     | ... | 0     |
| A-m-1 | 0     | 0     | 0     | 0     | 0     | C     | ... | 0     |
| ...   | ...   | ...   | ...   | ...   | ...   | ...   | ... | ...   |
| Z-e-r | 0     | 0     | 0     | 0     | 0     | 0     | ... | C     |
| None  | ?     | ?     | ?     | ?     | ?     | ?     | ... | ?     |
| None  | ?     | ?     | ?     | ?     | ?     | ?     | ... | ?     |

In an alternative embodiment, multiple dedicated neurons may be used, each branch having a number of dedicated nodes proportional to the number of CD-HMM states it includes. Thus for example, the left branch in FIG. 7 will have three dedicated neurons (designated l1, l2, and l3) while the right branch will have two dedicated neurons (designated r1 and r2). An exemplary weight matrix for a proportionally multiplied tree-based initialization is shown below:

|         | A-b-1 | A-b-2 | A-b-3 | A-b-4 | A-b-5 | A-m-1 | ... | Z-e-1 |
|---------|-------|-------|-------|-------|-------|-------|-----|-------|
| A-b-l1  | C     | C     | C     | 0     | 0     | 0     | ... | 0     |
| A-b-l2  | C     | C     | C     | 0     | 0     | 0     | ... | 0     |
| A-b-l3  | C     | C     | C     | 0     | 0     | 0     | ... | 0     |
| A-b-r1  | 0     | 0     | 0     | C     | C     | 0     | ... | 0     |
| A-b-r2  | 0     | 0     | 0     | C     | C     | 0     | ... | 0     |
| ...     | ...   | ...   | ...   | ...   | ...   | ...   | ... | ...   |
| Z-e-r1  | 0     | 0     | 0     | 0     | 0     | 0     | ... | C     |
| None    | ?     | ?     | ?     | ?     | ?     | ?     | ... | ?     |
| None    | ?     | ?     | ?     | ?     | ?     | ?     | ... | ?     |

Figure 4:
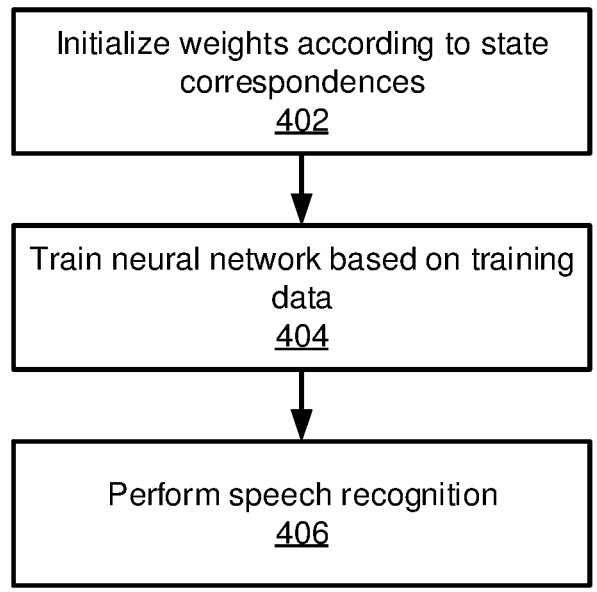
FIG. 4 is a block/flow diagram of a method for training a neural network and performing speech recognition in accordance with the present principles.

Referring now to FIG. 4, a method for training an NN-AM is shown. Block 402 initializes the weights according to state correspondences. The precise manner of this initialization will depend on whether phone states or CI-HMM states are being used. If phone states are being used, $N_p$ dedicated hidden neurons 206 are used in the final hidden layer, one for each phone. The dedicated neuron for a phone X is initialized to have strong connections to the output neurons 208 of the CD-HMM states that belong to this phone (e.g., X-*-*). Following the example of the first table above, a dedicated neuron is prepared for the phone A, and this neuron is initialized to strongly connect to the output targets of A-b-1, A-b-2, A-m-1, A-e-1, and A-e-2. Thus, an $N_p \times N_{CD}$ region of the weight matrix is initialized to represent the $N_p$ dedicated neurons.

If CI-HMM states are used instead, $N_{CI}$ dedicated neurons are prepared, where each corresponds to a separate CI-HMM state. The dedicated for a state X-Y is initialized to have strong connections to the output neurons of the CD-HMM states that belong to this CI-HMM state (e.g., X-Y-*). Following the second table above, a dedicated neuron is prepared for the CI-HMM state A-b and this neuron is initialized to strongly connect to the output neurons of A-b-1 and A-b-2. Another dedicated neuron is prepared for the state A-m, and this neuron is initialized to strongly connect to the output neuron of A-m-1. Thus, an $N_{CI} \times N_{CD}$ region of the weight matrix is initialized to represent the $N_{CI}$ dedicated neurons. In these embodiments, $N_h \geq N_p$ is needed for phone-grouping initialization and $N_h \geq N_{CI}$ is needed for CI-HMM-grouping initialization.

The optimal value for the constant C to use when initializing the values of the weights 204 will depend on the particular application. In some experiments based on an English-language training corpus, the best results were produced using a value for C of 7, whereas experiments based on a Japanese-language training corpus found the best results when the value for C was 5. To select the value for C, training may be performed with a variety of different C values and then compared to find the value for C that provides the greatest reduction in word-error or character-error rate compared to the baseline (e.g., compared to training with random initialization). In another embodiment, the value for C can be selected based on an error rate for data that is held back from the training phase for testing.

Block 404 then performs training on the NN-AM using appropriate training data. It is important to note that all weights 204 are updated during training. In other words, the "constant" value imposed during initialization is not held constant during training. The trained NN-AM may then be used for speech recognition. It should be noted that this training step may be performed by setting the physical states of a neural network or by updating software weights. Exemplary training processes include cross-entropy training followed by Hessian-free sequence training.

Once the NN-AM has been trained, it may be employed for speech recognition in block 406, converting spoken language into textual information. Experimental testing of the present embodiments have shown error reductions between about 3% and about 7% compared to the baseline.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 5:
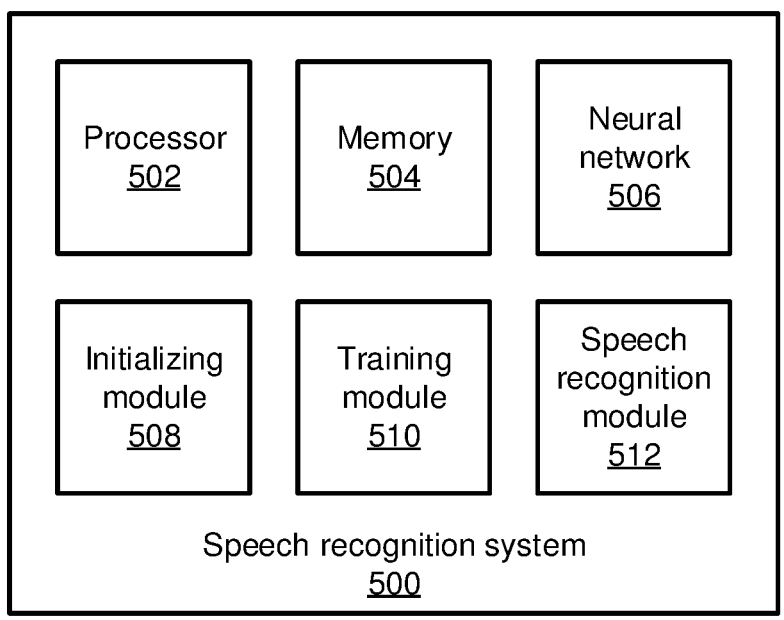
FIG. 5 is a block diagram of a system for training a neural network and performing speech recognition in accordance with the present principles.

Referring now to FIG. 5, a speech recognition system 500 is shown. The speech recognition system 500 includes a hardware processor 502 and a memory 504. The speech recognition system 500 further includes an artificial neural network 506, which may be implemented in software or may, alternatively, be implemented using hardware neuron and weight components. The speech recognition system 500 further includes one or more functional modules which, in one embodiment, may be implemented as software that is stored in memory 504 and executed by hardware processor 502. In alternative embodiments, the functional modules may be implemented as one or more discrete hardware modules in the form of, e.g., application-specific integrated chips or field programmable gate arrays.

In particular, an initializing module 508 initializes weights 204 in the neural network 506 between a final hidden neuron layer and an output neuron layer, with the weights being initialized to a constant value C if they represent a correspondence between a phone or CI-HMM state of a hidden neuron and a CD-HMM state of an output neuron. Block 510 then trains the neural network 506, for example according to an English- or Japanese-language training corpus. Speech recognition module 512 subsequently uses the trained neural network 506 to perform speech recognition on new audio information to produce corresponding textual information.

Figure 6:
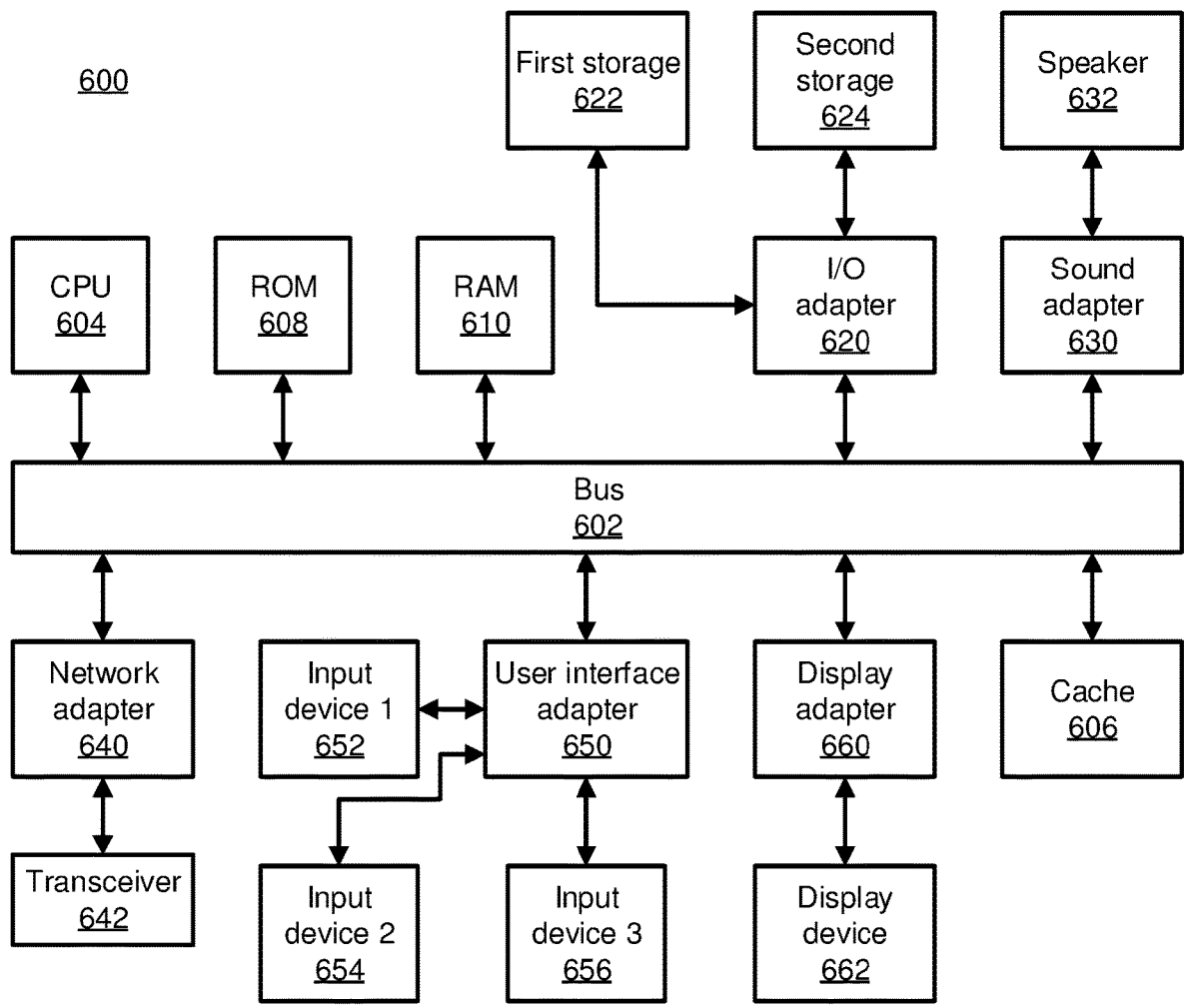
FIG. 6 is a block diagram of a processing system in accordance with the present principles.

Referring now to FIG. 6, an exemplary processing system 600 is shown which may represent the transmitting device 100 or the receiving device 120. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for training a neural network, comprising:
   identifying a first set of weights in a neural network that each connect an identified neuron of a final hidden layer to a respective neuron of an output neuron layer, wherein each identified neuron of the final hidden layer has a phone state that matches a hidden Markov model phone state of the respective neuron of the output neuron layer;
   identifying a second set of weights in the neural network between the final hidden layer and the output neuron layer, other than those identified in the first set of weights;
   initializing the identified first set of weights to a predetermined non-zero value and initializing the identified second set of weights differently from the first set of weights; and
   training the neural network based on a training corpus after initialization.

2. The method of claim 1, wherein identifying weights comprises identifying neurons on the final hidden neuron layer that have a context independent hidden Markov model position state that further matches a context dependent hidden Markov model position state of a respective neuron of the output neuron layer.

3. The method of claim 1, wherein identifying weights comprises identifying neurons on the final hidden neuron layer that correspond to a branch of a phonetic decision tree that includes a context dependent hidden Markov model state of a respective neuron of the output neuron layer.

4. The method of claim 1, further comprising randomly initializing weights associated with neurons in the final hidden neuron layer that do not match a state of any of the output neurons.

5. The method of claim 1, further comprising performing speech recognition using the trained neural network to convert audio voice information into textual information.

6. The method of claim 1, wherein the neural network comprises hardware weights.

7. The method of claim 1, wherein identifying weights comprises identifying multiple weights corresponding to state matches between multiple dedicated neurons in the final hidden neuron layer and multiple neurons of the output neuron layer.

8. The method of claim 7, wherein a number of the multiple weights is proportional to a number of phones in a particular branch of a phonetic decision tree.

9. A non-transitory computer readable storage medium comprising a computer readable program for training a neural network, wherein the computer readable program when executed on a computer causes the computer to perform steps of:
- identifying a first set of weights in a neural network that each connect an identified neuron of a final hidden layer to a respective neuron of an output neuron layer, wherein each identified neuron of the final hidden layer has a phone state that matches a hidden Markov model phone state of the respective neuron of the output neuron layer;
- identifying a second set of weights in the neural network between the final hidden layer and the output neuron layer, other than those identified in the first set of weights;
- initializing the identified first set of weights to a predetermined non-zero value and initializing the identified second set of weights differently from the first set of weights; and
- training the neural network based on a training corpus after initialization.

10. A system for training a neural network, comprising:
- an initializing module comprising a processor configured to identify a first set of weights in a neural network that each connect an identified neuron of a final to a respective neuron of an output neuron layer, wherein each identified neuron of the final hidden layer has a phone state that matches a hidden Markov model phone state of the respective neuron of the output neuron layer, to identify a second set of weights in the neural network between the final hidden layer and the output neuron layer, other than those identified in the first set of weights, to initialize the identified first set of weights to a predetermined non-zero value, and to initialize the identified second set of weights differently from the first set of weights; and
- a training module configured to train the network based on a training corpus after initialization.

11. The system of claim 10, wherein the initializing module is further configured to identify neurons on the final hidden neuron layer that have a context independent hidden Markov model position state that further matches a context dependent hidden Markov model position state of a respective neuron of the output neuron layer.

12. The system of claim 10, wherein the initializing module is further configured to identify neurons on the final hidden neuron layer that correspond to a branch of a phonetic decision tree that includes a context dependent hidden Markov model state of a respective neuron of the output neuron layer.

13. The system of claim 10, wherein the initializing module is further configured to randomly initialize weights associated with neurons in the final hidden neuron layer that do not match a state of any of the output neurons.

14. The system of claim 10, further comprising a speech recognition module configured to perform speech recognition using the trained neural network to convert audio voice information into textual information.

15. The system of claim 10, wherein the neural network comprises hardware weights.

16. The system of claim 10, wherein the initializing module is further configured to identify multiple weights corresponding to state matches between multiple dedicated neurons in the final hidden neuron layer and multiple neurons of the output neuron layer.

17. The system of claim 16, wherein a number of the multiple weights is proportional to a number of phones in a respective branch of a phonetic decision tree.

18. The method of claim 1, wherein initializing the identified weights is completed before training begins.

* * * * *